United States Patent [19]

Martin

[11] 4,226,690
[45] Oct. 7, 1980

[54] PROCESS FOR DEHYDRATION AND DEMINERALIZATION OF DILUTED BITUMEN

[75] Inventor: Robert B. Martin, Spring, Tex.

[73] Assignee: Petrolite Corporation, St. Louis, Mo.

[21] Appl. No.: 43,597

[22] Filed: May 29, 1979

[51] Int. Cl.$^2$ ............................................. B03C 5/00
[52] U.S. Cl. .................................................. 204/190
[58] Field of Search ................................ 204/186–191

[56] References Cited

U.S. PATENT DOCUMENTS

| 2,072,917 | 3/1937 | Woelflin | 204/191 |
| 2,072,918 | 3/1937 | Woelflin | 204/188 |
| 3,232,860 | 2/1966 | Waterman | 204/302 |
| 3,334,038 | 8/1967 | Lucas | 204/190 |
| 4,049,535 | 9/1977 | Winslow | 204/305 |

Primary Examiner—T. M. Tufariello
Attorney, Agent, or Firm—Sidney B. Ring; Hyman F. Glass

[57] ABSTRACT

Diluted bitumen emulsion, the aqueous phase of which carries undissolved mineral particles, is upgraded by resolving it by subjecting it to a unidirectional electric field established between an energized electrode and an aqueous material surface serving as an electrical ground. The emulsion is introduced below the level of such surface and allowed to rise. A potential gradient is provided which is sufficient to cause coalescence of the aqueous material in the emulsion as soon as the emulsion breaks the aqueous material surface, the emulsion thereby being resolved at such surface.

12 Claims, 6 Drawing Figures

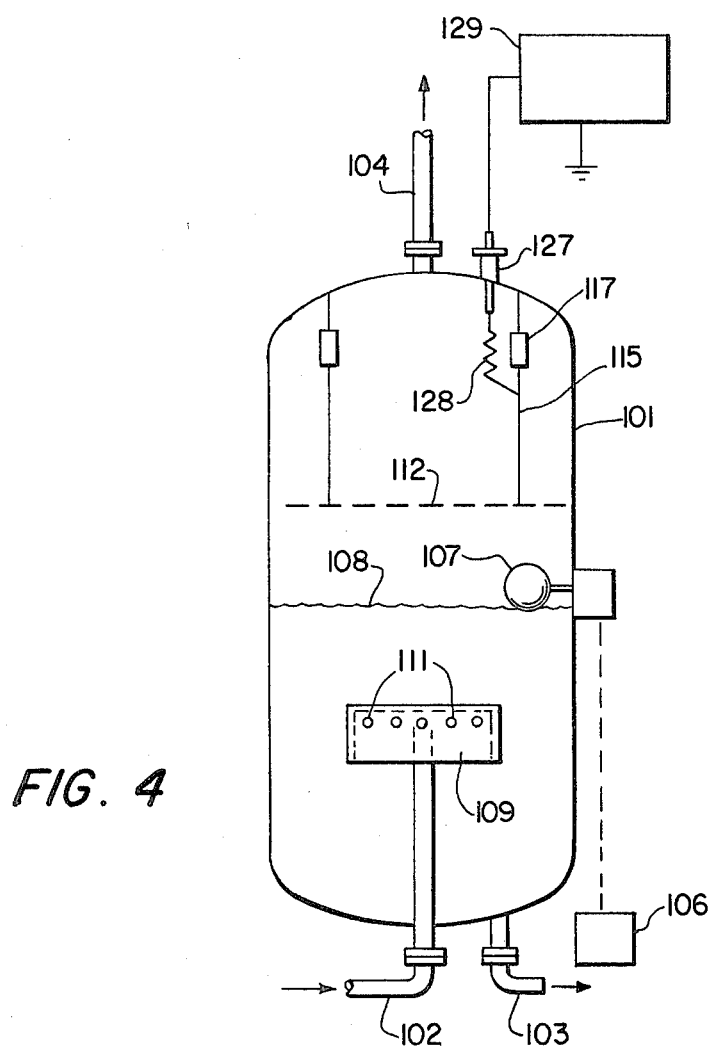
FIG. 4
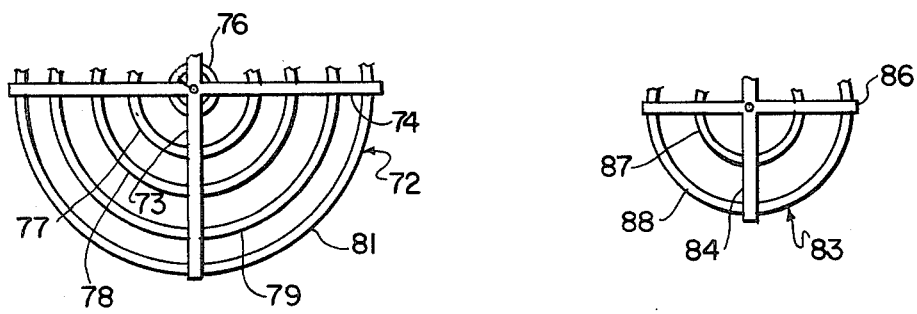
FIG. 5
FIG. 6

PROCESS FOR DEHYDRATION AND DEMINERALIZATION OF DILUTED BITUMEN

BACKGROUND OF THE INVENTION (1) Field of the Invention.

This invention relates to the dehydration and demineralization of diluted bitumen emulsions obtained from tar sands and the like. More particularly, this invention relates to the treatment of such diluted bitumen by electric field treatment to resolve the emulsions, whereby aqueous material carrying undissolved particulate mineral solids separate out. As used herein, the term "emulsion" is used to include dispersions resembling emulsions as well as true emulsions.

(2) Description of the Prior Art

One of the processes employed in the production of hydrocarbons from tar sands is the hot water process of bitumen recovery. In this process, the bitumen is produced as a froth on top of the water. A diluent capable of dissolving the bitumen, usually a hydrocarbon liquid such as benzene, xylene, toluene, naphtha, kerosene, furnace distillates, Diesel fuels, or the like, is added to the bitumen to facilitate water and solids separation. Such separation is then accomplished by centrifugation, utilizing, for example, low speed "Bird" scroll-type centrifuges followed by high speed "Westfalia" centrifuges (available commercially from the Bird Machine Company and Westfalia Separator A. G., respectively).

Among the patents describing processes of the above or similar type are Canadian Pat. No. 918,091 to Evans and Camp and U.S. Pat. No. 2,968,603 to Gordon R. Coulson, No. 3,900,389 to Robert A. Baillie, and No. 4,035,282 to Frederick C. Stuchberry and Alfred E. Backstrom. Most important of the tar sands to which such processes are applied are the Athabasca tar sands found primarily in Northern Alberta, Canada.

The centrifuged, diluted, bitumen still contains a considerable quantity of water and particulate mineral solids. It is typical to find about 25–30 wt. % water and about 5 to 10 wt. % mineral solids in the diluted bitumen feed to the Bird centrifuge; and about 20 to 25 wt. % water and about 2 to 5 wt. % mineral solids in the diluted bitumen feed to the Westfalia centrifuge (produced by the Bird Centrifuge). The product from the Westfalia Centrifuge typically contains about 5 to 10 wt. % water and about 1 to 3 wt. % mineral solids.

Efforts to upgrade the quality of the diluted bitumen have been beset with difficulties and considerable research has gone into achieving an efficient process for producing really clean diluted bitumen with minimum loss of hydrocarbons.

OBJECTS OF THE INVENTION

It is an object of this invention to provide an efficient process for upgrading the quality of diluted bitumen.

Other objects will become apparent from the following description.

SUMMARY OF THE INVENTION

The above and other objects of the invention are accomplished by providing a process for electrically resolving a diluted bitumen emulsion having immiscible aqueous and organic liquid phases, the aqueous phase carrying undissolved mineral particles, comprising (a) establishing a unidirectional current electric field between an energized electrode and an aqueous material surface serving as an electrical ground; (b) introducing the emulsion below the level of the aqueous material surface and allowing the emulsion to rise to the surface; (c) providing an emulsion treating gradient in the electric field of sufficient magnitude to cause coalescence of the aqueous material in the emulsion as soon as the emulsion breaks the aqueous material surface, whereby substantially all the emulsion is resolved at the aqueous material surface; and (d) recovering aqueous and organic liquid materials resolved from the emulsion.

The unidirectional current field may be either a continuous direct current field or a pulsed direct current field.

The diluted bitumen emulsion employed is preferably one produced by extracting tar sands with hot water, whereby bitumen is obtained in a froth on top of the water, removing the froth and adding a diluent to it to obtain a diluted bitumen containing water and undissolved mineral particles.

Optionally, the diluted bitumen may be subjected to centrifugation prior to the electrical resolution procedure in order to separate and remove a portion of the water and mineral particles. Such centrifugation may be carried out utilizing a low speed centrifuge such as a Bird centrifuge. The so centrifuged product may be subjected directly to the electrical resolution procedure or may be subjected first to a secondary centrifugation utilizing a high speed centrifuge, such as a Westfalia centrifuge. The diluent is preferably a hydrocarbon liquid, naphtha being very suitable. A demulsifier may be added to the diluted bitumen feed before it is subjected to the electrical resolving treatment to help clarify the water-solids effluent. The emulsion is maintained at a temperature in excess of 180° F. during the treatment.

In the preferred embodiment, a body of the aqueous material is maintained in the bottom portion of a treating vessel, the diluted bitumen emulsion is passed into the body of the aqueous material and allowed to rise to the surface thereof. The emulsion is resolved when it breaks the surface. The demulsified aqueous material from the emulsion is allowed to collect in the body of aqueous material. The treated diluted bitumen rises to the upper portion of the treating vessel. Aqueous material is withdrawn from the lower portion of the treating vessel and treated diluted bitumen from the upper portion of the vessel. Preferably, a liquid level controller maintains the level of the aqueous material surface at a level providing the desired distance between it and the energized electrode.

The diluted bitumen material subjected to treatment in the present process, consisting of solids, water, bitumen and diluent, is both a mixture and an emulsion. Part of the material is a water in oil emulsion and, since the solids are water-wetted, the solids are with the water in the oil. Ordinary oilfield emulsions with solids would not have water-wetted solids but would have oil-wetted solids, which are difficult to separate. In the diluted bitumen with solids, the water in oil emulsion is broken as in conventional treatment of ordinary oilfield emulsions with alternating current, and in addition the unidirectional field holds the wetted solids away from the oil. Thus, the electric field presents a barrier, like a filter, to the passage of the solids.

The preferred apparatus for carrying out the present treating process is that disclosed and claimed in the application of Weldon D. Mayse and Frederick D. Watson, Ser. No. 43,551, filed concurrently with (May 29, 1979) the present Application, the disclosure of which is incorporated herein by reference.

BRIEF DESCRIPTION OF THE DRAWINGS

Referring to the accompanying drawings:

FIG. 4 is a diagrammatic representation of a vertically elongated treater suitable for carrying out the present process.

FIG. 5 is a partial plan view of an electrode suitable for use in a vertically elongated treater suitable for carrying out the present process.

FIG. 6 is a partial plan view of an alternative electrode suitable for use in a vertically elongated treater suitable for carrying out the present process.

DESCRIPTION OF SPECIFIC EMBODIMENTS

Figure 1:
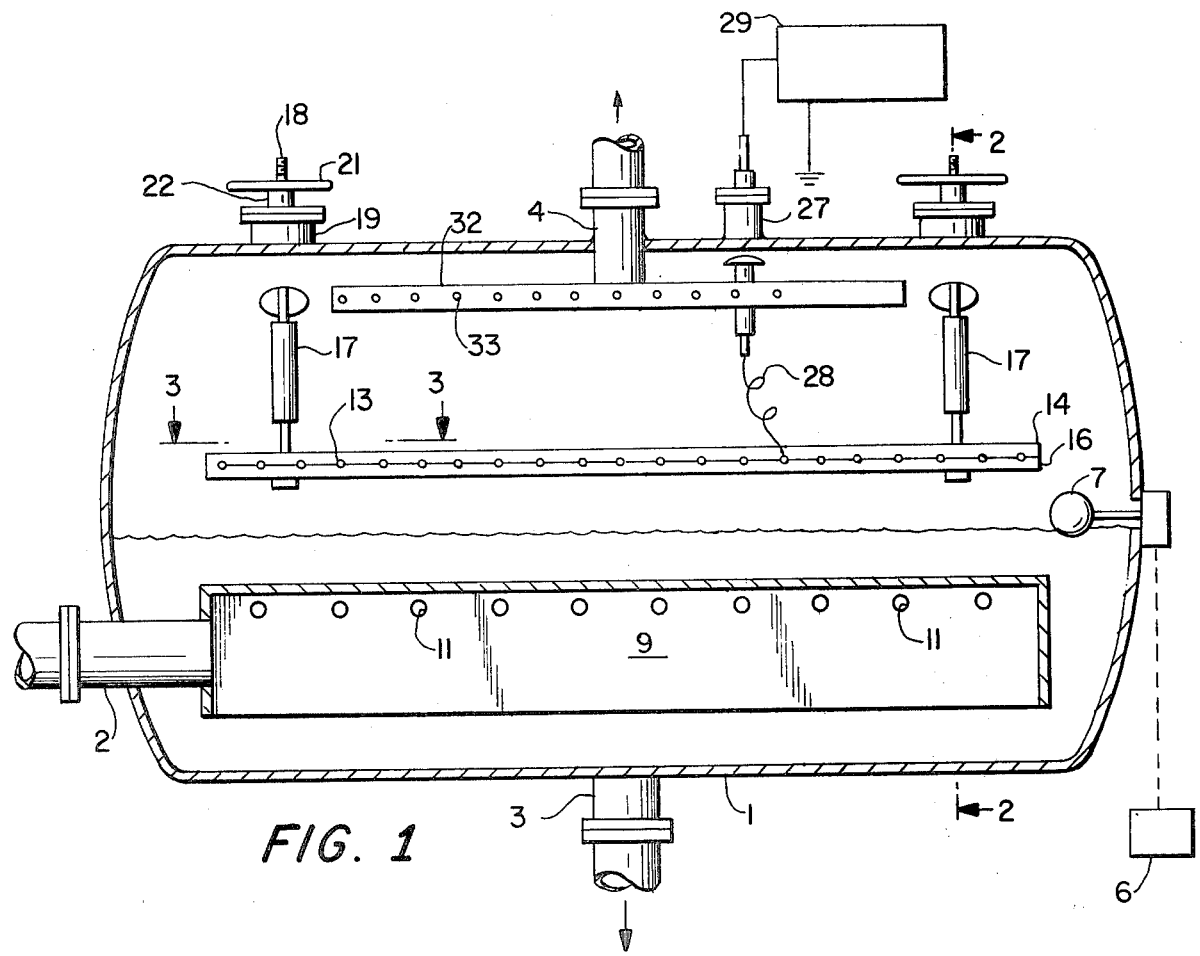
FIG. 1 is a vertical section of a Mayse and Watson electric treater suitable for carrying out the present process.
Figure 2:
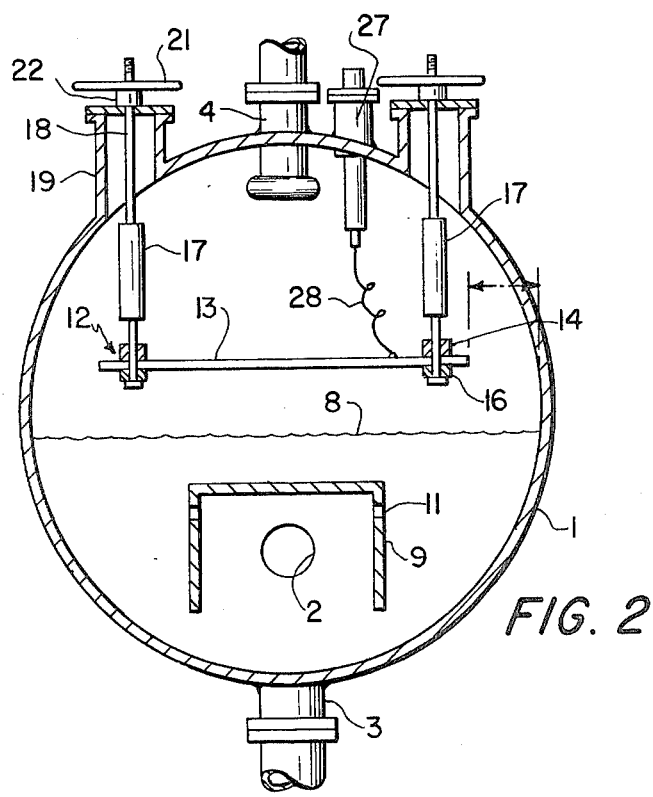
FIG. 2 is a cross-section taken along line 2—2 of the treater shown in FIG. 1.

In FIGS. 1 and 2, there is shown a treating apparatus which may suitably be employed in the practice of the present invention, which apparatus is the subject of the above referred to patent application of Weldon D. Mayse and Frederick D. Watson. The apparatus includes a metallic vessel 1 carrying emulsion inlet 2, aqueous material outlet 3 and organic material outlet 4. A level controller 6 actuated by a float 7 controls the flow of fluid from the outlet 3 and thereby maintains water surface 8 at a relatively constant level within the vessel 1. The water surface 8 is the interface between the bulk aqueous material in the lower portion of the vessel 1 and the emulsion or organic material thereabove depending upon operation of the apparatus. A distributor 9 divides the incoming emulsion from the inlet 2 into a plurality of upwardly directed uniform flows. The emulsion flows upwardly from openings 11 to the water surface 8, then between the water surface 8 and an energized horizontally disposed electrode 12, and then toward the outlet 4. The water surface 8 serves as an electrically grounded electrode and may be characterized as a "water-surface electrode". The level controller 6 is adapted to maintain the water surface above the openings 11 in the distributor 9, shown here as an inverted pan distributor.

Figure 3:
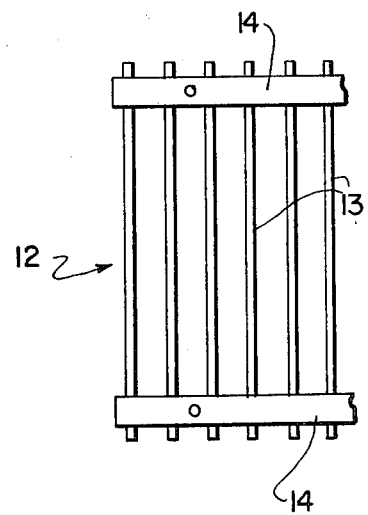
FIG. 3 is a partial plan view of the energized electrode shown in FIG. 1.

The electrode 12, as shown in FIG. 3, is formed of rods 13 mounted transversely upon spaced supporting clamp bars 14 and 16. Since fluid can flow through the spaces between the rods 13, the electrode 12 may be termed "permeable". Other types of permeable electrodes, or foraminous electrodes, may be employed instead of that shown. However, rods are preferred for their mechanical properties and also have the advantage of not presenting sharp edges where high voltage discharge can occur. The electrode 12 is supported from insulators 17 secured to the vessel 1 and is spaced apart from the vessel walls. It should extend substantially across the cross-section of the vessel 1, covering sufficient area so that an effective treating gradient is established throughout the electric field traversed by the emulsion flowing between the water-surface 8 and the energized electrode 12.

The insulators 17 may be supported for vertical adjustment so that the spacing between the electrode 12 and the water surface 8 may be varied to adjust the emulsion treating gradient. For this purpose, a threaded rod 18 connects to the insulators 17 and passes upwardly through spools 19 carried on the vessel 1. A hand wheel 21 threadedly engages the rod 18 exteriorly of the spools 19. A packing gland 22 located atop the spool 19 seals fluidly tight a polished section on the threaded rod 18. Thus, the hand wheel 21 is rotated to move the threaded rod 18 vertically which adjusts the vertical spacing between the energized electrode 12 and the water surface 8. Preferably, however, the distance between the electrode 12 and the water surface 8 is adjusted by adjusting float control 7 or otherwise adjusting water level controller 6.

The electrode 12 is energized from an external unidirectional current power source, designated generally as 29, which has one terminal grounded, the other terminal connecting through an entrance bushing 27 to lead 28 inside the vessel 1. Lead 28 connects to the energized electrode 12. Any source of continuous direct current or pulsed direct current may be employed. An example of a pulsed direct current source is that described in U.S. Pat. No. 4,049,535 to Joseph D. Winslow.

A collector 32 connects to the outlet 4. The collector is shown here in the form of a pipe having a plurality of openings 33 through which fluid enters on passage to the outlet 4, although other forms of collectors may be employed. Preferably, the collector 32 extends the length of the electrode 12. With this arrangement in the vessel 1, the emulsion from the inlet 2 passes from the distributor 9 below the water surface 8, flows through the electric field between the energized electrode and the water surface 8, and then flows towards the outlet 4.

The optimum distance separating the energized electrode 12 and the walls of vessel 1 will depend largely on the nature of the emulsion which it is desired to treat and the electrical potential which will be employed. Such separation should be such that the critical voltage of the emulsion positioned between electrode 12 and the grounded walls of vessel 1 will not be equalled or exceeded by the potential applied to the electrode, the critical voltage being that at which the emulsion becomes highly conductive. This critical voltage phenomenon is believed due the fact that at higher voltages, substances present in the organic phase of the emulsion ionize, causing small increases in potential to produce large increases in current flows. The use of spacing greater than the minimum sufficient separation will reduce the power consumed in the treater. Similarly the distance separating the electrode 12 and the water surface should be such so that the emulsion positioned between them will not be subjected to a voltage gradient above the critical voltage.

In operation, a unidirectional current potential is applied to the electrode 12 sufficient in magnitude so that substantially all treating of the emulsion occurs at the water surface. If the potential is insufficient for this purpose, it may still be adequate to resolve the emulsion at a location intermediate the electrode 12 and the water surface 8. The emulsion, under such potential, can form an internal "pad" wherein the aqueous material is of sufficient concentration to serve as a grounded electrode which appears to be a second water-surface electrode in function. Such internal "pad" can be eliminated by reducing the emulsion flow rate, increasing the electrode potential, or raising the water level closer to the electrode. The elimination of the internal "pad" indicates that a sufficient potential is being applied to the electrode 12 so that substantially all treating occurs immediately at the aqueous material surface 8. Coalescence of the aqueous phase content thereby takes place instantaneously as soon as the emulsion breaks the aqueous material surface, with no settling required. The potential applied to the energized electrode 12 can be varied proportionally to the emulsion flow through the distributor 9 into the vessel 1 for maintaining treatment at the water surface 8 for all operable rates of emulsion flow into the vessel 1. The aqueous material level may also be used as an operating control by interlocking it with the power source. The system would automatically seek and hold the highest practical water level to assure optimization.

The potential upon the electrode 12 may be adjusted for the highest rate of emulsion flow within the vessel 1. Thus, the current flow established at such potential will accommodate the maximum capacity of emulsion throughput of the apparatus. These treating conditions will maintain effective treating between the electrode 12 and the water surface 8 at the maximum rate of emulsion flow. The treating occurs at the water surface 8 for all lesser flow rates of emulsion throughput in the vessel 1.

In the majority of situations, the apparatus can be operated with a potential applied to the energized electrode 12 sufficient to effect an emulsion treating gradient between about 0.5 and about 4 kilovolts per inch spacing between the electrode 12 and the water surface 8. However, a specific range of such potential gradients is not universally applicable since emulsion characteristics vary significantly. This gradient must, in any event, not reach or exceed the point where small increases in potential produce disproportionately large increases in current flow through the emulsion traversing the electric field between the energized electrode 12 and the water surface 8.

Thus, the emulsion treating gradient is preferably set by adjusting the applied potential so that the current flow is sufficient to resolve substantially all of the emulsion immediately at the water surface 8 but insufficient to cause excessive current flows.

Instead of the horizontally elongated treating vessel shown in FIGS. 1 and 2 described above, a vertically elongated or spherical vessel may be employed. Vertically elongated treaters are useful for low treating rates where a small electrode is required. When such vessels reach a diameter of ten feet to obtain the desired electrode area, a horizontally elongated treater becomes cheaper. Spherical treaters have certain theoretical advantages but are expensive and difficult to transport.

Vertically elongated treaters up to ten feet in diameter do not require a collector. FIG. 4 shows such a treater in diagrammatic representation. This treater includes a vertically elongated generally cylindrical metallic vessel 101 having an emulsion inlet 102, aqueous material outlet 103 and organic material outlet 104. A lever controller 106, shown here as actuated by a float valve 107 (although other devices known in the art may be employed for this purpose) controls the flow of aqueous material from the outlet 103 by means not shown and thereby maintains the water surface 108 at a relatively constant level within the vessel 101. The water surface 108 is the interface between the body of aqueous material in the lower portion of the vessel 101 and the emulsion or organic material thereabove. An inverted pan distributor, placed below the water surface 108, divides the incoming emulsion from the inlet 102 into a plurality of upwardly directed uniform flows.

The emulsion flows upwardly from openings 111 to the water surface 108, then between the water surface 108 and an energized horizontally disposed permeable planar electrode shown diagrammatically at 112, and then toward the outlet 104. The level controller 106 is adapted to maintain the water surface above the openings 111 in distributor 109.

The electrode 112 extends substantially across the cross-section of the vessel 101, but is spaced apart from the vessel walls. It may be of the type shown in FIG. 5 or 6. The electrode is supported by rods 115 from insulators 117 secured to the top of vessel 101. Other types of permeable or foraminous electrodes may be employed instead of those of FIG. 5 or 6.

The distance between the electrode 112 and the water surface 108 may be varied by adjusting float control 107 or otherwise adjusting water level controller 106.

The electrode 112 is energized by a suitable unidirectional current high voltage power source 129, which has one terminal grounded, the other terminal connecting through an entrance bushing 127 to lead 128 inside the vessel 101. Lead 128 connects to the energized electrode 112.

With this arrangement in the vessel 101, the emulsion from the inlet 102 passes from the distributor 109 to the water surface 108, flows through the electric field between the energized electrode and the water surface 108, which serves as an electrically grounded electrode, then flows toward the outlet 104. The emulsion is resolved at the aqueous material surface, causing the internal aqueous phase to coalesce and become part of the body of aqueous material. Aqueous material is withdrawn from outlet 103.

The treater of FIG. 4 may suitably have a height of nine feet. The top of the distributor 109 may suitably be located three feet above the bottom of the vessel 101 and the electrode 112 four feet below the top of the vessel. The distance between the level of the water surface 108 and the electrode 112 may suitably be varied between 4 and 11 inches.

The details of a suitable planar electrode 72 are shown in FIG. 5. The electrode 72 is formed by steel strap members 73 and 74 secured together as a cross. Five annular rods 76, 77, 78, 79 and 81 of ⅜ inch steel are secured by welding to the straps 73 and 74. The rod 76 is formed with a diameter of 2½ inches. The remaining electrode rods are spaced 1¼ inches, on centers, from each other and from the rod 76. The electrode 72 has a vertical dimension of approximately 1 inch.

FIG. 6 illustrates an alternative form of planar electrode, generally designated 83. The electrode 83 includes straps 84 and 86 welded into the form of a cross. Upon the straps are mounted steel bands 87 and 88. These bands have a vertical dimension of approximately ¾ inch and are formed from 1/16 inch thick spring steel.

It will be apparent that permeable planar electrode configurations other than those shown in FIGS. 5 and 6 can be employed.

In accordance with my invention, diluted bitumen containing a considerable quantity of water and mineral solids is subjected to the action of a treater as above described. This process may be utilized:

(1) As a replacement for the Bird centrifuge with results which also eliminate the need for the secondary high speed Westfalia centrifuge. This is the preferred mode of utilization.

(2) As a replacement for the Westfalia centrifuge following the use of the Bird centrifuge.

(3) As a tertiary separation process following the use of the Bird and Westfalia centrifuges.

With relatively low D.C. potential (5 KV to 10 KV), an overhead oil having only 0.1–0.3% water and 0.05–0.15% mineral content may be obtained. The treater will maintain electrical stability during such operation for extended runs.

In contrast to the treatment using direct current, a similar treatment using alternating current yields a wetter oil with increased power consumption and electrical instability.

The success of the process appears to be unique to the solids and water contained in diluted bitumen, the process not being successfully applicable, for example, to wet and dirty tank bottoms.

In a laboratory scale test of the present process, feed for a Bird or Westfalia naphtha diluted bitumen emulsion, obtained from Athabasca tar sands as above described, admixed with 6 ppm of a demulsifier, was fed into a laboratory treater having a 3 inch diameter Teflon (polytetrafluoroethylene) lined upper treating column and a 7 inch diameter approximately 1 foot long lower section, which serves as an accumulator. The emulsion was fed into a body of aqueous material the surface of which was maintained approximately 20 inches below an energized electrode. A direct current electric field was maintained between the electrode and the aqueous material surface. Aqueous material and solids were withdrawn from the bottom portion of the accumulator at a rate calculated to maintain the level in the treater substantially constant. The treatment was carried out with the diluted bitumen heated by heat exchange with a mineral oil maintained at 200° F. Power usage typically was 15 watts at 10,000 volts, continuous direct current, with peaks up to 50 watts. The accumulator is merely a laboratory means to maintain level and flow and is not a necessary part of a commercial treating apparatus.

The results of these test runs are tabulated as follows:

|  | EXAMPLES | | | |
| --- | --- | --- | --- | --- |
|  | 1 | 2 | 3 | 4 |
| Feed Type | Bird* feed | Westfalia feed | Bird feed | Bird feed |
| Feed Rate, cc/min | 54 | 50 | 50 | 100 |
| Nominal Water Phase Residence Time (Including Time In Accumulator), Hrs. | 9 | 1 | 1 | 1 |
| Feed Composition | | | | |
| water, wt. % | 28.9 | 23.4 | 25.0 | 25.9 |
| mineral, solids, wt. % | 1.5 | 1.6 | 2.7 | 3.2 |
| Product Quality | | | | |
| water, wt. % | 0.32 | 0.30 | 0.20 | 0.33 |
| mineral, solids, wt. % | 0.073 | 0.05 | 0.05 | 0.10 |
| Tailings | | | | |
| oil, wt. % | 2–8 | — | — | — |
| Power Usage, Watts | 15–30 | 24–40 | 16–30 | 16–30 |
| Parasitic Power, Percent | 23–46 | | | |

*Although labelled "Bird" feed, this feed had a mineral content corresponding to a "Westfalia" feed.

In the above tabulated runs, the treating process was not carried out at optimum efficiency due to variations in operating parameters, including the level of the aqueous material surface, which could not be adequately controlled in the laboratory equipment employed.

The Teflon liner used in the laboratory treater used in the above runs is not necessary in large scale treaters. In small scale pilot and laboratory treaters it is not feasible to keep a sufficient distance between the energized electrode and the wall of the treating vessel to avoid undesired treatment at the electrode edges. In a large scale commercial treater, the use of such a lining would be very expensive. It is feasible to maintain sufficient space between the electrode and the vessel wall in such large scale treaters so that the treated diluted bitumen present in such space supplies the necessary insulation, even in the absence of the Teflon lining, to avoid treatment at the edges. Reference is made to the above noted Mayse and Watson application for a fuller discussion of this feature.

The diluent employed in the above runs was a naphtha recovered from a diluent recovery unit. It contained a kerosene type starter plus natural naphtha fractionated from the bitumen. However, the nature of the diluent is not critical and any of those mentioned in the Description of the Prior Art, above, may be employed.

From the foregoing, it will be seen that there has been described a treating process well suited for resolving diluted bitumen emulsions by means of electric fields. The foregoing description of the evention is to be taken as illustrative and not limitative. Various changes may be made in the present invention without departing from its spirit.

I claim:

1. A process for electrically resolving a diluted bitumen emulsion having immiscible aqueous and organic liquid phases, said aqueous phase carrying undissolved mineral particles, comprising:
    (a) establishing a unidirectional current electric field between an energized electrode and an aqueous material surface serving as an electrical ground;
    (b) introducing said emulsion below the level of the aqueous material surface, and allowing said emulsion to rise to said surface;
    (c) providing an emulsion treating gradient in the electric field of sufficient magnitude to cause coalescence of the aqueous material in said emulsion as soon as said emulsion breaks said aqueous material surface, whereby substantially all the emulsion is resolved at the aqueous material surface; and
    (d) recovering aqueous and organic liquid materials resolved from said emulsion.

2. The process of claim 1 wherein said unidirectional current field is a continuous direct current field.

3. The process of claim 1 wherein said unidirectional current field is a pulsed direct current field.

4. The process of claim 1 wherein said diluted bitumen emulsion is produced by extracting tar sands with hot water, whereby bitumen is obtained in a froth on top of the water, removing said froth and adding a diluent to it to obtain a diluted bitumen containing water and undissolved mineral particles.

5. The process of claim 1 wherein said diluted bitumen emulsion is produced by extracting tar sands with hot water, whereby bitumen is obtained in a froth on top of the water, removing said froth, adding a diluent to it to obtain a diluted bitumen containing water and undissolved mineral particles and centrifuging said diluted bitumen to separate and remove a portion of said water and mineral particles.

6. The process of claim 5, wherein the centrifuging operation is carried out by subjecting said diluted bitumen to the action of a low speed centrifuge.

7. The process of claim 5, wherein the centrifuging operation is carried out by subjecting said diluted bitumen first to the action of a low speed centrifuge and then to the action of a high speed centrifuge.

8. The process of claim 1, wherein the diluent in said diluted bitumen emulsion is a hydrocarbon liquid.

9. The process of claim 1, wherein the diluent in said diluted bitumen emulsions is naphtha.

10. The process of claim 1, wherein a demulsifier is added to the diluted bitumen emulsion feed before it is subjected to the electrical resolving treatment.

11. The process of claim 1 wherein said emulsion is resolved at a temperature in excess of 180° F.

12. A process for electrically resolving a diluted bitumen emulsion having immiscible aqueous and organic liquid phase, said aqueous phase carrying undissolved mineral particles, comprising:
    (a) maintaining a body of aqueous material in the bottom portion of a treating vessel;
    (b) establishing a unidirectional current electric field between an energized electrode and the surface of said body of aqueous material, said energized electrode being positioned above said surface;
    (c) passing diluted bitumen emulsion into said body of aqueous material below the level of the aqueous material surface, and allowing said emulsion to rise to said surface;
    (d) providing an emulsion treating gradient in the electric field of sufficient magnitude to cause coalescence of the aqueous material in said emulsion as soon as said emulsion breaks said aqueous material surface, whereby substantially all the emulsion is resolved at the aqueous material surface;
    (e) allowing the de-emulsified aqueous material to collect in said body of aqueous material;
    (f) allowing the treated diluted bitumen to rise to the upper portion of said treating vessel; and
    (g) withdrawing aqueous material from the lower portion of said treating vessel and treated diluted bitumen from the upper portion of said treating vessel.

* * * * *